March 23, 1965  D. H. WARD  3,174,194
BUS BODY WINDOW
Filed Jan. 12, 1961  2 Sheets-Sheet 1
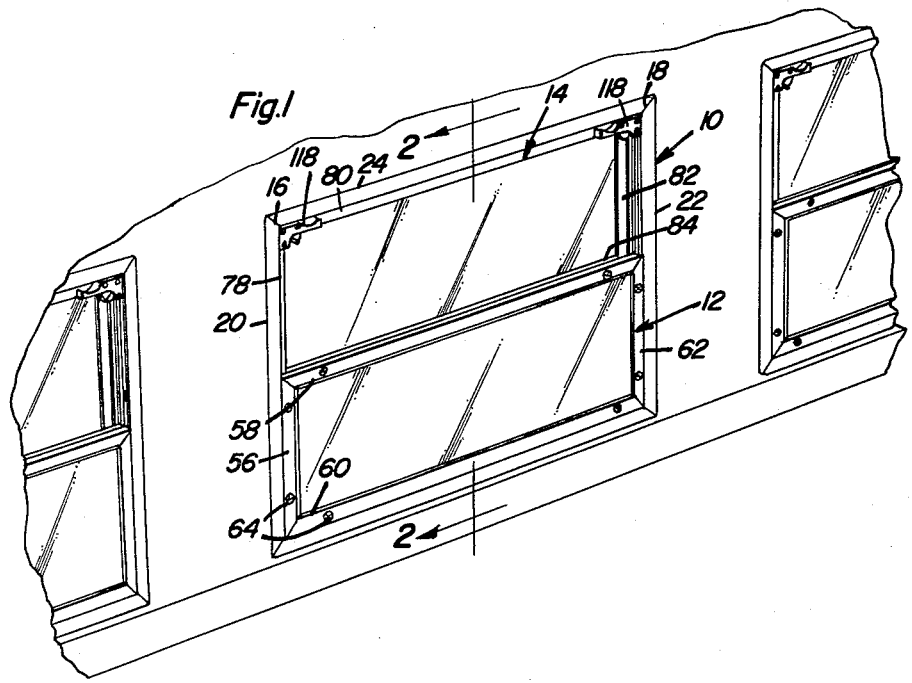
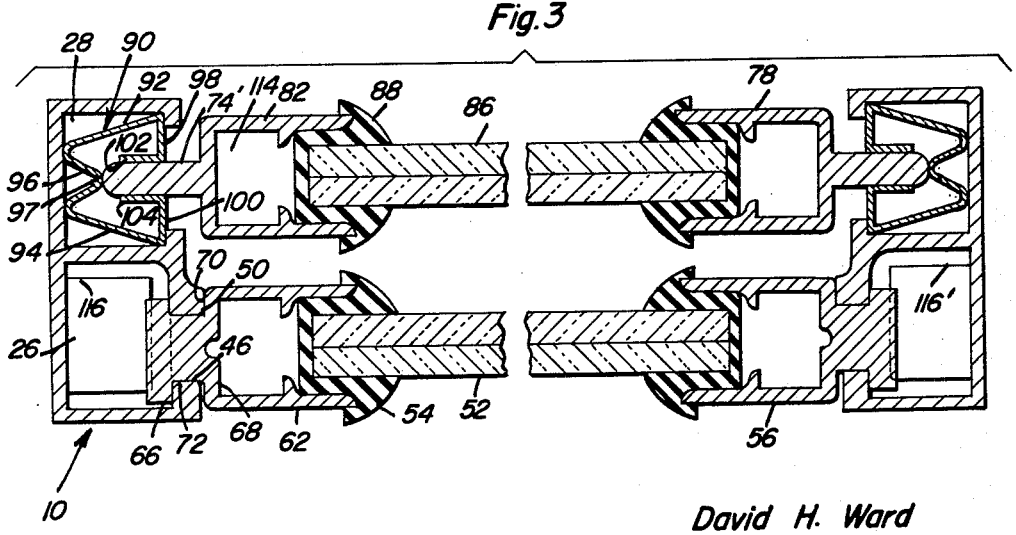
David H. Ward
INVENTOR.

March 23, 1965     D. H. WARD     3,174,194
BUS BODY WINDOW

Filed Jan. 12, 1961     2 Sheets-Sheet 2

David H. Ward
INVENTOR.

United States Patent Office 3,174,194
Patented Mar. 23, 1965

3,174,194
BUS BODY WINDOW
David H. Ward, Conway, Ark., assignor, by mesne assignments, to Ward Body Works, Incorporated, Conway, Ark., a corporation of Arkansas
Filed Jan. 12, 1961, Ser. No. 82,235
7 Claims. (Cl. 20—52.4)

This invention relates to window structures, and particularly to a window construction for a bus body.

In certain passenger carrying vehicles, such as school buses, there are commonly used vertically sliding windows. Such windows are usually provided with two separately constructed panes encased in an individual framing with both panes and their framing mounted in a complete window frame. It is conventional practice in the construction of such windows, to have the lower window rigidly locked in place during manufacture of the window to prevent school children from projecting portions of their bodies through the window frame, or escaping from the bus through the window by raising the lower pane. The upper pane is normally mounted in the window frame so that it may be reciprocated up and down whereby the window may be opened or closed as desired for ventilation and other purposes. It is common practice to provide a latching device for holding the upper window in a plurality of selected positions.

Accordingly, it is an object of this invention to provide a vehicle window structure with a new and economical means for maintaining the lower pane of a vehicle window in a fixed position.

It is another object of the invention to provide a vehicle window having relatively movable panes therein wherein a single member is employed for permanently securing the lower pane in a closed position and also serving as a portion of the latch mechanism for the upper window.

It is yet another object of the invention to provide a vehicle window having relatively movable portions with a new and novel seal means therebetween.

It is still another object of the invention to provide a vehicle window which is airtight, rattle proof and yet easy and reliable to operate.

It is still another object of the invention to provide a vehicle window, particularly for school buses, comprising a plurality of panes in a rigid frame wherein at least one of the panes is movable relative to the frame for opening the window and provided with a reliable and simple latch means.

It is another object of the invention to provide a vehicle window frame which is sturdy in design, relatively economical to produce, and reliable and durable in use.

It is still another object of the invention to provide a window having a sliding pane and a fixed pane wherein the latch mechanism for the sliding pane acts as a stop mechanism when the sliding pane is open by contacting the upper surface of the fixed pane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view from the inside of a vehicle showing a plurality of the window assemblies installed therein;

FIGURE 3 is an enlarged cross-sectional view taken substantially on a horizontal plane through the lower portion of the window when both panes are open and looking upwardly;

Figure 2:
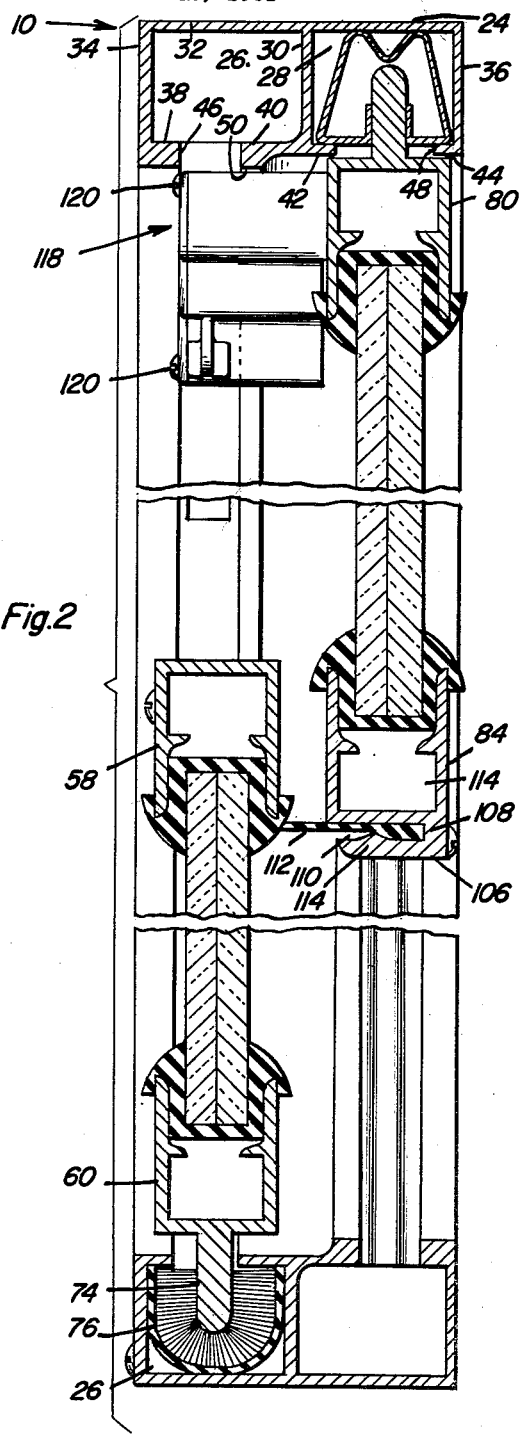
FIGURE 2 is an enlarged cross-sectional view taken substantially on the plane of line 2—2 in FIGURE 1.
Figure 4:
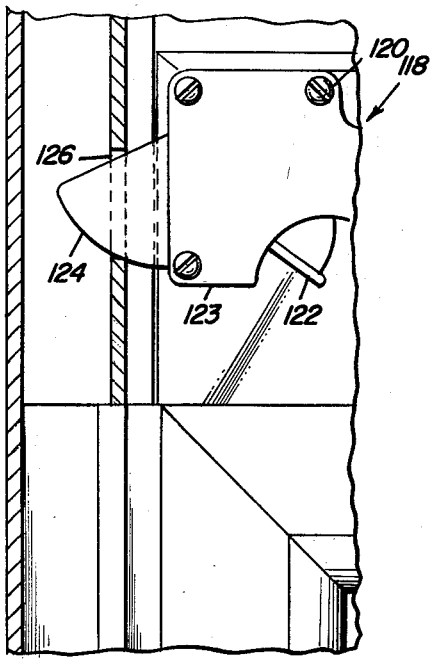
FIGURE 4 is an enlarged elevational view of the left central portion of the window assembly showing the upper window locked in a lowered position.

As shown in FIGURE 1, each window comprises a frame 10, a lower pane assembly or sash 12 and an upper pane assembly or sash 14.

The frame assembly 10 is composed of a one-piece aluminum extrusion notched and bent at a 90° angle at 16 and 18 to form side walls 20 and 22 and top wall 24.

Referring to FIGURE 2, it can be seen that the aluminum extrusion forming the window frame 10 comprises a strip of material which is substantially rectangular in cross-section and having a hollow interior divided into two rectangular chambers or channel guides 26 and 28 separated by a partition 30. The chambers 26 and 28 are formed by an outside wall 32, side walls 34 and 36 and a front wall having two slots 46 and 48 formed therein and comprising flanges 38, 40, 42 and 44. The flange 40 has a raised plane bearing surface 50.

The lower pane assembly 12 comprises a rectangular piece of safety glass 52 encased in a rubber molding strip 54. The glass 52 and strip 54 are enclosed by four edging members 58, 56, 60 and 62 which are beveled at a 45° angle at their abutting ends and secured together. The edging members 56 and 62 as shown in FIGURE 3, are formed of aluminum extrusion comprising a U-shaped member having a T-shaped head 66 formed on the bight of the U 68. The bight 68 has on its outer edge a bearing surface 70 which slidably engages with the bearing surface 50 on the window frame. The neck 72 of the T-head 66 extends through the slot 46 in the window framing and the chamber 26 receives the head 66 whereby the edge member 62 is slidably locked to the frame 10. The edge member 56 of the pane assembly 12 is a mirror image and identical in construction to the member 62.

As shown in FIGURE 2, the edging members 58 and 60 for the pane assembly 12 are similar to the edging members 56 and 62 except that the member 58 has the T-head 66 omitted whereby its upper surface is planar, and the member 60 has an integral rib 74 formed thereon other than the head member 66. The rib 74 has an arcuate lower edge and is received in a flexible weather stripping member 76 which is retained in the chamber 26 by flanges 38 and 40.

The frame member 14 comprises four rectangular edging members 78, 80, 82 and 84 beveled and secured together at their ends and enclosing a rectangular piece of safety glass 86 which is secured to the edging members by means of a rubber or plastic strip 88 identical to the strip 54. The same type of extrusion is used for making the members 78, 82 and 80 as is used for making the member 60.

Mounted in the chambers 28 of the window frame members 20, 24 and 22 is a resilient weather stripping member 90 composed of conventional material such as plastic. The weather stripping member 90 is generally W-shaped in cross section and comprises converging side walls 92 and 94 connected by a V-shaped rib 96. Extending inwardly from the side walls 92 and 94 are right angular flanges 98 and 100 having angularly extending ends 102 and 104 which are resiliently urged toward one another but forced apart by the ribs 74' on the members or stiles 78 and 82 being inserted therebetween. The end of the rib also contacts the apex 97 of the V-shaped center rib 96 of the weatherstrip 90. Since the ends 102 and 104 are resiliently urged against the rib 74', and since the ends of the rib or flange 74' contacts the rib apex 97, it can be seen that the pane assembly 14 is slidably retained in the frame 10 in an airtight and rattle-proof manner.

The lower edging member or meeting rail 84 of the pane assembly 14 is identical to the other edging members of the pane assembly except the back edge of the extrusion instead of having a rib 74 has an integral angular projection comprising right angular legs integrally formed with the back side of the member 84. Formed between the leg 106 and the back side of the member 84 is a thin slot 110 which receives and retains a flexible weather stripping plate member 112 which is locked in the groove by the ridge 114. The member 112 resiliently contacts a portion of the pane assembly 12 and effectively seals the clearance between the pane assemblies.

All of the edging members for the pane assemblies have a rectangular recess or passage 114 extending longitudinally therethrough. The ends of all the edging members for the frame assemblies are held together by angle members having the same size and cross-sectional shape as the chambers 114 and fitting within the end portions of the recesses 114. The legs of these angular members (not shown) are quite short such as one or two inches and are retained within the edging members by screws 64 which extend from the outside of the edging members into chambers 114 and the angular members.

Figure 5:
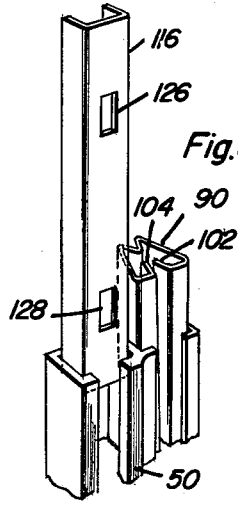
FIGURE 5 is a perspective partially exploded view of the upper portion of one section of the window frame showing a portion of the keeper and a portion of the window guide projecting from the top of the side frame.

As shown in FIGURE 5, and FIGURE 3, the upper portions of the frame members 20 and 22 contain channel bars or keeper members 116 which are aluminum extrusions of U-shaped cross-section and snugly fitting within the chambers 26. These keeper members extend from the top inner surface of frame member 24 to the top edge of the head member 66 of the edging members 56 and 62 so as to lock the pane assembly 12 permanently in its lowered position so that it cannot be raised. Secured to the inside surface of the member 80 at the edge thereof by screws 120 are two latching assemblies 118.

Each latch assembly 118 comprises a latch member 124 which is urged outwardly upon the housing 123 by spring or resilient means within the housing which is not shown. The latch 124 is manually retracted within the housing 123 and out of the recess 126 or 128 by manually pushing upward the trigger 122 which is positively connected to the latch. The keeper member 116 has a plurality of vertically spaced rectangular openings such as 126 and 128 shown in FIGURE 5 for receiving the latch 124 and thereby locking the pane assembly 14 in its closed position or in any selected open position.

From the above explanation, it can readily be seen that the keeper members 116 and 116' serve the dual function of holding the lower pane assembly 12 permanently in a lowered position and acting as a portion of the latch mechanism.

Although the weather stripping 110 is shown as fixed to the bottom edge of the upper pane 14, it could alternately be secured to the upper member 58 of the lower pane 12 for engaging the upper pane.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A window comprising a frame including vertical channel guides, resilient weatherstrips of generally W-shaped cross-section mounted in the guides, each of said weatherstrips having a centrally located inverted V-shaped rib defining an apex a vertically slidable sash in the frame, said sash comprising stiles including vertical flanges operable in the guides in spaced relation to the side walls thereof and slidable on the center apices of the weatherstrips.

2. A window comprising a frame including vertical channel guides, resilient weatherstrips of generally W-shaped cross-section mounted in the guides, each of said weatherstrips having a centrally located inverted V-shaped rib defining an apex a vertically slidable sash in the frame, said sash comprising stiles including vertical flanges operable in the guides in spaced relation to the side walls thereof and slidable on the center apices of the weatherstrips, said weatherstrips including inturned side flanges slidably receiving the first-named flanges therebetween.

3. A window in accordance with claim 2, the second-named flanges being of angular cross-section and frictionally engaged under tension with said first-named flanges.

4. A window in accordance with claim 3, said guides comprising inturned flanges on said side walls thereof engaged with said second-named flanges for retaining the weatherstrips in said guides.

5. A window in accordance with claim 4, said sash comprising a meeting rail having a deep lateral channel in its lower portion, a weatherstrip mounted in said channel and projecting horizontally from said meeting rail for engagement with a meeting rail of another sash, and a rib on a wall of the channel securing the second-named weatherstrip therein.

6. A window comprising a frame including vertical inner and outer channel guides, a lower sash in the lower portions of the inner guides, channel bars in the upper portions of the inner guides overlying and retaining said lower sash in a closed position therein, said channel bars including bight portions having vertically spaced openings therein, an upper sash mounted for vertical sliding adjustment in the outer guides, and locks on the upper sash engageable selectively in the openings for releasably securing said upper sash in adjusted position, said channel bars mounted in said inner channel guides opening in an opposite direction to said channel guides and said channel guides further being provided with inturned flanges overlying the bight portions of said channel bars for guiding said channel bars during assembly of the window.

7. A window comprising a frame including vertical inner and outer channel guides, a lower sash in the lower portions of the inner guides, channel bars in the upper portions of the inner guides, overlying and retaining said lower sash in a closed position therein, said channel bars including bight portions having vertically spaced openings therein, an upper sash mounted for vertical sliding adjustment in the outer guides, locks on the upper sash engageable selectively in the openings for releasably securing said upper sash in adjusted position, resilient weather strips of generally W-shaped cross-section mounted in the outer guides, said weather strips including inturned resilient flanges and a centrally located inverted V-shaped rib defining an apex, said upper sash comprising stiles including vertical flanges disposed between the inturned flanges and slidable on the center apices of the weather strips.

References Cited by the Examiner

UNITED STATES PATENTS

| 1,688,231 | 10/28 | Fisher | 20—52 X |
| 2,388,044 | 10/45 | Drab | 160—40 |
| 2,660,274 | 11/53 | Donathan | 189—64 |
| 2,701,631 | 2/55 | Stouder et al. | 189—64 |
| 2,736,402 | 2/56 | Hicks | 189—64 |
| 2,775,004 | 12/56 | Fuller | 20—52.4 X |

HARRISON R. MOSELEY, *Primary Examiner.*

JOSEPH D. BEIN, GEORGE A. NINAS, Jr., NORTON ANSHER, BENJAMIN BENDETT, *Examiners.*